United States Patent
Shacham et al.

(10) Patent No.: US 9,736,332 B2
(45) Date of Patent: Aug. 15, 2017

(54) AUTOMATIC DETECTION OF CORNERS OF AN IMAGED DOCUMENT

(75) Inventors: Omri Shacham, Mitzpe Ramon (IL); Oren Haik, Beer-Sheva (IL); Smadar Shiffman, Tel Aviv (IL); Oded Perry, Rehovot (IL)

(73) Assignee: Hewlett-Packard Indigo B.V., Amstelveen (NL)

( * ) Notice: Subject to any disclaimer, the term of this patent is extended or adjusted under 35 U.S.C. 154(b) by 1243 days.

(21) Appl. No.: 13/308,061

(22) Filed: Nov. 30, 2011

(65) Prior Publication Data

US 2013/0135689 A1    May 30, 2013

(51) Int. Cl.
| | |
|---|---|
| H04N 1/40 | (2006.01) |
| G06K 15/00 | (2006.01) |
| H04N 1/38 | (2006.01) |
| G06T 5/00 | (2006.01) |
| G06T 7/194 | (2017.01) |
| H04N 1/64 | (2006.01) |

(52) U.S. Cl.
CPC .............. *H04N 1/38* (2013.01); *G06T 5/002* (2013.01); *G06T 7/194* (2017.01); *G06T 2207/20021* (2013.01); *H04N 1/642* (2013.01)

(58) Field of Classification Search
USPC ........................................ 358/1.9, 2.1, 1.18
See application file for complete search history.

(56) References Cited

U.S. PATENT DOCUMENTS

| | | | |
|---|---|---|---|
| 5,978,519 A * | 11/1999 | Bollman et al. | 382/282 |
| 5,995,661 A | 11/1999 | Amidei | |
| 6,507,670 B1 * | 1/2003 | Moed | 382/172 |
| 7,016,536 B1 * | 3/2006 | Ling et al. | 382/190 |
| 7,145,699 B2 * | 12/2006 | Dolan | 358/452 |
| 7,773,803 B2 | 8/2010 | Fan | |
| 7,817,854 B2 | 10/2010 | Taylor | |
| 8,238,615 B2 * | 8/2012 | Cerosaletti et al. | 382/112 |
| 2002/0039443 A1 * | 4/2002 | Sakamoto | 382/173 |
| 2009/0086275 A1 * | 4/2009 | Liang et al. | 358/3.21 |
| 2011/0035661 A1 | 2/2011 | Balinsky et al. | |

FOREIGN PATENT DOCUMENTS

| | | |
|---|---|---|
| JP | 2009-123155 A | 6/2009 |
| KR | 20070092513 A | 9/2007 |

* cited by examiner

Primary Examiner — Richard Zhu
(74) Attorney, Agent, or Firm — HP Inc. Patent Department

(57) ABSTRACT

A method includes obtaining an image of a document against a background. A bounding box that bounds a region of the image that is distinguishable from the background is found. Coordinates of a plurality of points of the distinguishable region are found, each point being a point of the distinguishable region that is closest to each corner of the bounding box. The document is identified within the image as a region of the image whose corners are defined by the found coordinates.

21 Claims, 7 Drawing Sheets

AUTOMATIC DETECTION OF CORNERS OF AN IMAGED DOCUMENT

BACKGROUND

It is sometimes desirable to image a printed or other hardcopy document and to save a representation or image of the document in digital form. For example, the digital representation of the document may be manipulated (e.g. edited or otherwise modified) or distributed electronically (e.g. over a network or via a digital storage medium). A scanning or imaging device such as a scanner or digital camera may be utilized to perform such a conversion. The scanner may use an optical sensor to sense light that is reflected from a part of the document and convert the sensed light in digital form. For example, a pixel of a representation of the document may characterize and encode the sensed reflected light as a monochromatic digital image of gray level pixels, or as a polychromatic image, e.g. of red-green-blue (RGB) pixels A scanner sensor may be configured with a field of view that may only enable sensing reflected light from a portion of the document. In such a case, relative motion is effected between a scanner head to which the scanner sensor is mounted, and the document to be scanned. For example, with some scanner configurations (e.g. a flatbed scanner), the scanner head may be moved relative to a stationary document. In other configurations (e.g. a document scanner) the document may be transported relative to a stationary scanner head. For example, with some scanner configurations, document may be conveyed to or past a scanning element by a conveyor belt.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

DETAILED DESCRIPTION

Figure 1:
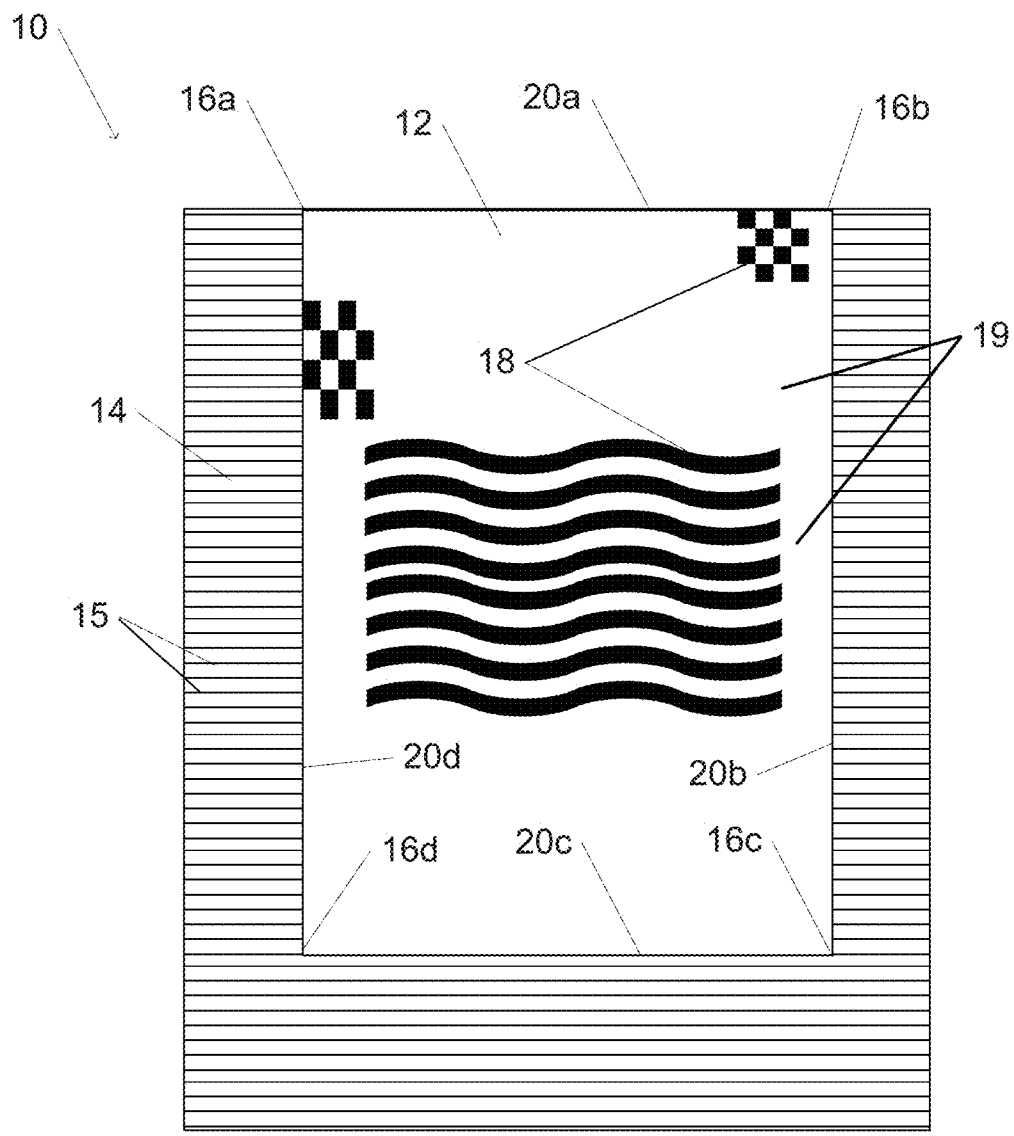
FIG. 1 illustrates an example of a scanned image containing a page image, on which an example of automatic detection of corners of an image of a scanned document may be applied.

In accordance with an example of corner detection of scanned or imaged documents (digital imaging of any type being herein referred to as scanning or being scanned), a scanned image may represent an image of the document itself, or page image, against an image of a scanner background. For example, the scanner background may include a surface on which the document was resting or held to when the document was scanned. Corners of the image of the page image may be automatically detected within the scanned image. Thus, the page image may be distinguishable from the scanner background image, or image background. The scanned image may then be automatically edited to include only the page image, and to exclude the scanner background image. The edited image may then be further processed, e.g. by application of optical character recognition (OCR) to identify text, or distributed.

In accordance with an example of corner detection of scanned document, an image of the image background in the scanned image may be characterized. For example, the image background image may be characterized by a regular pattern of shadings or markings. For example, a regular background pattern may be characteristic of treads of a conveyor belt on which the document was placed when it was scanned.

The page image may be distinguishable from the image background. For example, the scanned document may have included text or graphics that were printed on a document background that is distinguishable from the image background. For example, the document background may include a plain unpatterned white or substantially uniformly colored substrate (e.g. paper or other printing substrate), or a decorated or patterned substrate with a pattern with characteristics that are distinguishable from those of the image background.

When the document includes printed content on a document background, the page image may include a margin or border that is distinguishable from the image background. Thus, a region of the scanned image may be identified that is distinguishable from the image background. For example, such a region may be automatically identified by automatically identifying discontinuities (e.g. sharp changes in value) in calculated standard deviations in (e.g. a gray level) of rows and columns of the scanned image. For example, a standard deviation of a row or column that only includes image background may have a substantially constant value. On the other hand, the standard deviation for a row or column that includes part of the page image may have a value that is distinguishable from the value for the image background.

A bounding box that bounds the distinguishable region may be automatically calculated for the distinguishable region. The bounding box may or may not coincide with the page image. For example, if the document was rotated with respect to a scanner head or the image background pattern, a corner of the page image may not coincide with a corner of the bounding box.

A corner of the page image may be identified by identifying a point of the distinguishable region that lies closest to a corner of the bounding box. The page image may then be identified as a rectangular (or polygonal) region that is defined by the identified corners. Identification of the page image by its corners may enable accurate extraction of the page image from the scanned image, regardless of rotation or skewing of the page image.

An example of automatic detection of corners of an image of a scanned document as described herein may have advantages over other methods that were previously described. For example, application of Harris corner detection could require more computations per pixel of the image than examples of the corner detection described herein. Furthermore, application of Harris corner detection could detect corners within the image background. Thus, Harris corner detection could entail further processing to identify the relevant corners of the page image among detected corners.

FIG. 1 illustrates an example of a scanned image containing a page image, on which an example of automatic detection of corners of an image of a scanned document may be applied.

Scanned image 10 includes page image 12. Page image 12 may include printed content 18 (e.g. text or graphics) printed on a document background 19 (represented by the unpatterned white regions of page image 12). Page image 12 may be bounded by page edges 20a through 20d, and defined by page corners 16a through 16d. Page corners 16a through 16d may be automatically detected by application of an example of automatic detection of corners of an image of a scanned document.

Although page image 12 is shown here as a rectangular region bounded by four page edges 20a through 20d, and defined by four page corners 16a through 16d, examples of automatic detection of corners of an image of a scanned document may be applicable to some other polygonal shapes (e.g. a shape whose corners may be unambiguously related to corners of a bounding box that bounds the shape).

Page edges 20a through 20d of page image 12 are shown in FIG. 1 as being parallel to the sides of scanned image 10. However, examples of automatic detection of corners of an image of a scanned document may be applicable also when page image 12 is rotated with respect to scanned image 10. A degree of rotation that may be tolerated may depend on details of the example of automatic detection of corners that is applied.

Scanned image 10 includes image background 14 that is shown partially surrounding page image 12. In particular page edge 20a is shown as coinciding with a boundary of scanned image 10. Thus, the side of page image 12 that is bounded by page edge 20a is not surrounded by image background 14. (Examples of automatic detection of corners of an image of a scanned document may be applicable also to a scanned image in which the image background completely surrounds the page image.)

Image background 14 may be patterned with a substantially regular pattern, e.g. a horizontal line pattern such as line pattern 15. As in the example shown, horizontal line pattern 15 shows variation in a single dimension (perpendicular to the horizontal lines of the pattern). For example, line pattern 15 may represent a pattern of treads on a conveyer belt that conveyed the document during scanning. Examples of automatic detection of corners of an image of a scanned document may be applicable also to a pattern with a regular two-dimensional variation or other characterizable regular pattern.

Figure 2:
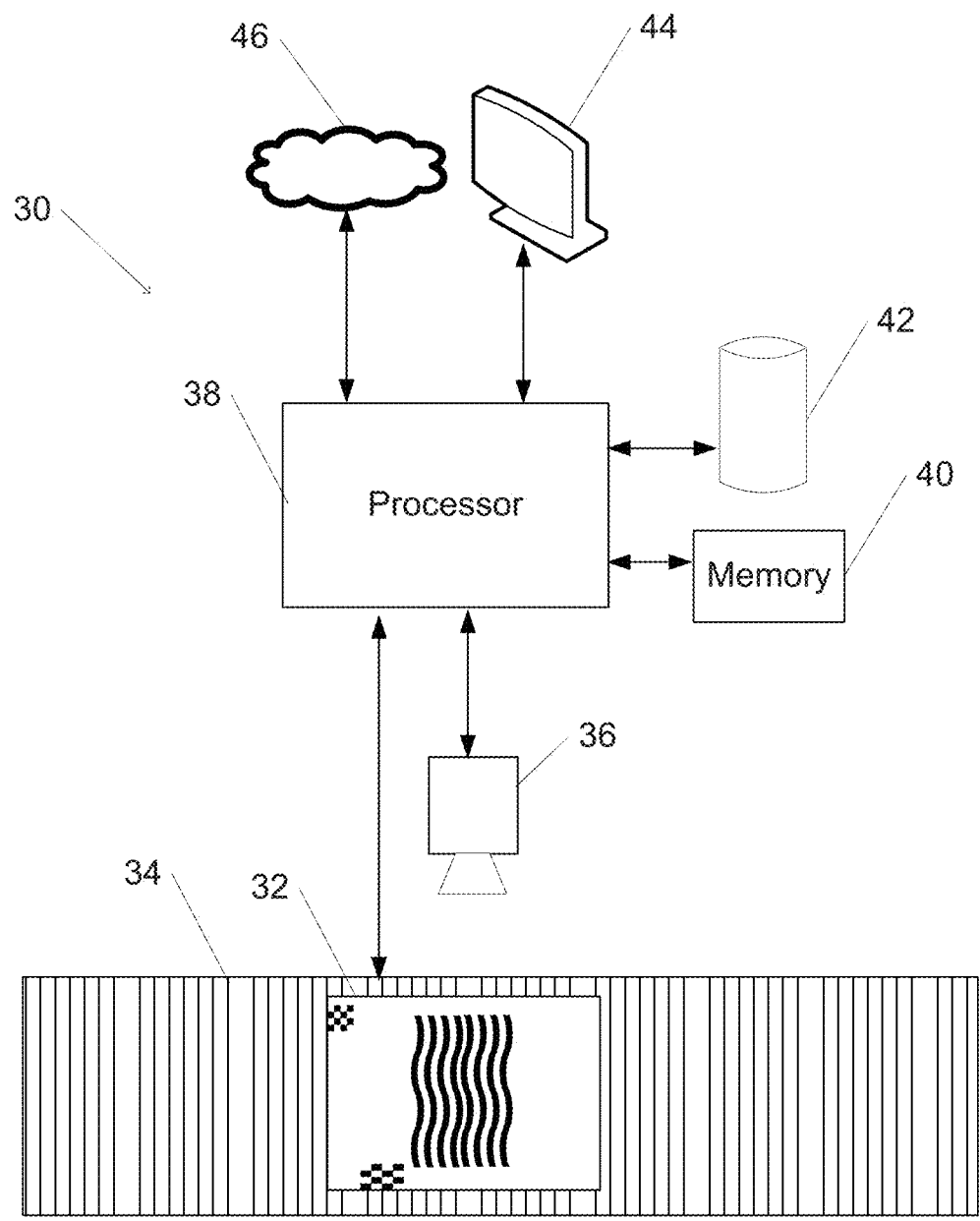
FIG. 2 is a schematic drawing of an example of a system to automatically detect corners of an image of a scanned document.

FIG. 2 is a schematic drawing of an example of a system to automatically detect corners of an image of a scanned document.

System 30 may include a processor 38. Processor 38 may include one or more intercommunicating processors that may operate in accordance with programmed instructions. For example, at least a component of processor 38 may be incorporated into a processor of a computer or into a processor or controller of a scanner. All such processors and controllers are considered as incorporated into processor 38.

Processor 38 may communicate with memory 40. Memory 40 may include one or more volatile or non-volatile memory devices capable of storing data. For example, memory 40 may be utilized to store, among other data, programmed instructions to operate processor 38, acquired scanned images, results generated during or as a result of processing scanned images, or parameters or data utilized in processing scanned images.

Processor 38 may communicate with data storage device 42. Data storage device 42 may represent a computer readable medium in the form of one or more fixed or removable non-volatile data storage devices. For example, data storage device 42 may be utilized to store, among other data, programmed instructions to operate processor 38, acquired scanned images, results generated during or as a result of processing scanned images, or parameters or data utilized in processing scanned images.

Processor 38 may communicate with an imaging device represented by optical scanner sensor 36. Optical scanner sensor 36 may include a sensor, or a collection or array of sensors, such as a camera or scanner head, that are capable of acquiring a digital image of a document 32 or other object. For example, processor 38 may control scanner sensor 36 to acquire an image. The image may be in the form of an array (e.g. rows and columns) of pixels, each pixel including image data (e.g. monochromatic gray scale or polychromatic RGB data). Processor 38 may process the acquired image or store the acquired image in memory 40 or data storage device 42.

For example, processor 38 may control scanner sensor 36 to acquire an image of document 32. Document 32 may be scanned when placed on or held to surface 34. For example, surface 34 may represent a conveyer belt or other transport device for transporting document 32 to or past scanner sensor 36. For example, operation of a conveyance device represented by surface 34 may be controllable by processor 38.

For example, an acquired image may correspond to scanned image 10 (FIG. 1). An image of document 32 may correspond to page image 12 of scanned image 10. An image of part of surface 34 may correspond to image background 14 of scanned image 10.

The acquired image, or results of processing of an acquired image, may be displayed on a display 44, may be saved in memory 40 or data storage device 42, or may be exported via network 46.

A method for automatic detection of corners of an image of a scanned document may be applied to an image acquired by system 30, e.g. by processor 38.

Figure 3:
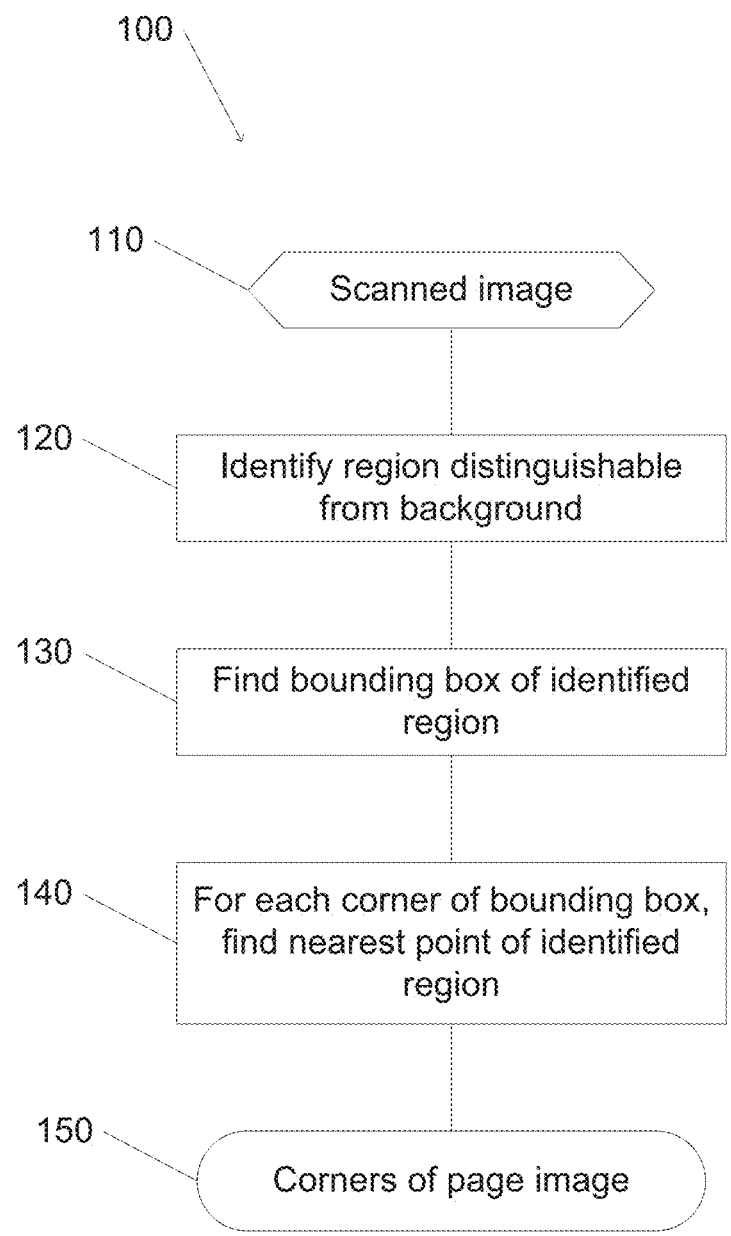
FIG. 3 is a flowchart of an example of a method for automatic detection of corners of an image of a scanned document.
Figure 4:
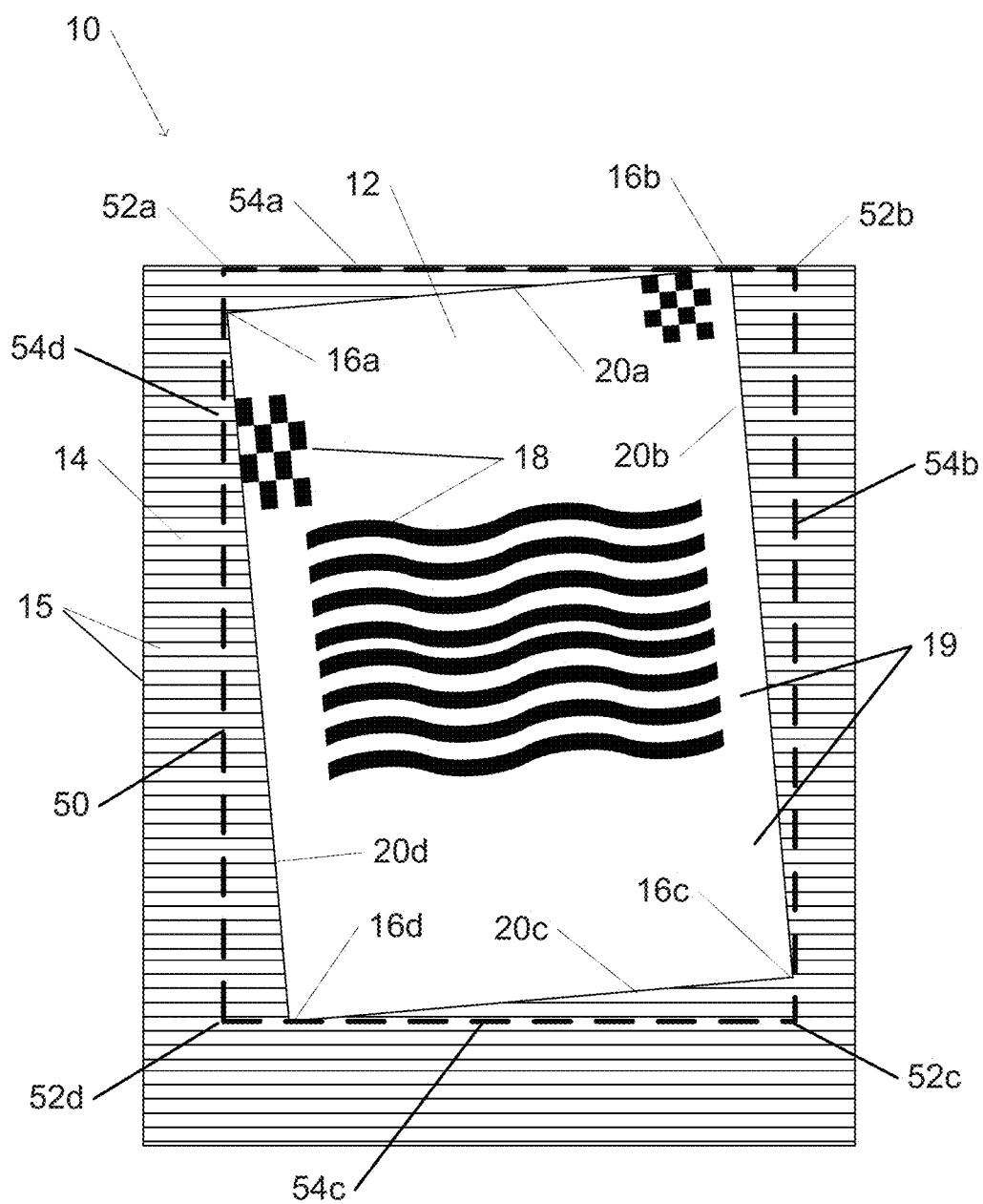
FIG. 4 illustrates an example of application of the method illustrated in FIG. 3.

FIG. 3 is a flowchart of an example of a method for automatic detection of corners of an image of a scanned document. FIG. 4 illustrates an example of application of the method illustrated in FIG. 3.

It should be understood with the flowchart of FIG. 3, and with regard to all flowcharts referred to herein, that the illustrated division of the method into discrete operations represented by blocks of the flowchart has been selected for convenience and clarity only. Alternative division of the method into discrete operations is possible with equivalent results. Such alternative division into operations should be understood as representing other examples of the illustrated method. Similarly, the illustrated order of operations represented by blocks of the flowchart has been selected for convenience and clarity only. Unless otherwise indicated, operations that are represented by blocks of the flowchart may be executed in an alternative order, or concurrently, with equivalent results. Such reordering of the operations should be understood as representing other examples of the illustrated method.

Automatic corner detection method 100 may be applied to an acquired scanned image (block 110), such as scanned image 10.

A region of scanned image 10 may be identified that is distinguishable from image background 14 (block 120). For example, image background 14 may be characterized by a regular pattern, here represented by (horizontal) line pattern 15. Such a regular pattern may thus be characterized by applying techniques of image analysis to sections (e.g. row, column, or other section) of scanned image 10. For example, statistical analysis that is applied to a section that includes only a regularly patterned image background 14 (e.g. calculating a standard deviation of a column of the image, or a two-dimensional Fourier analysis of regions of the image) may yield a particular characteristic value. That characteristic value may be distinguishable from results of application of a similar analysis to a section (e.g. row or column) of page image 12 that includes portions of page image 12 (e.g. document background 19, printed content 18, or both). Thus, the distinguishable region may include, or substantially coincide with, page image 12. However, in order to automatically delineate and utilized the distinguishable region, the corners of the distinguishable region remain to be located. Further operations of automatic corner detection method 100 may thus locate corners of a distinguishable region that may be identified with page image 12.

A bounding box 50 may be found to enclose the identified distinguishable region (block 130). For example, a bounding box 50 may be defined to be rectangular such that box sides 54a through 54d are parallel to sides of scanned image 10. For example, box sides 54a and 54c may be each defined so as to coincide with a pixel row of scanned image 10, and box sides 54b and 54d may be each defined so as to coincide with a pixel column of scanned image 10. For example, a boundary may be determined by a discontinuity in a calculated characterization of adjacent rows or columns. As another example, a bounding box with a number of sides different from four (e.g. corresponding to detected boundaries of the identified distinguishable region), and with an arbitrary orientation, may be found.

Page image 12 may be rotated or skewed by a rotation angle with respect to boundaries of scanned image 10 or with respect to line pattern 15. In such a case, a box sides 54a through 54d of bounding box 50 (e.g. if found by examination of rows and columns), may not coincide with edges 20a through 20d of page image 12. Thus, further processing may be performed in order to automatically estimate the locations of page corners 16a through 16d of page image 12.

In accordance with some examples of a method for automatic detection of corners of an image of a scanned document, application of the method may be limited to images with rotation angles smaller than a maximum angle. Similarly, in accordance with some examples of a method for automatic detection of corners of an image of a scanned document, application of the method may be limited to images in which the page image whose corners are to be automatically located is characterized by a substantially uniform margin, e.g. characterized as document background 19.

For each box corner 52a through 52d of bounding box 50, a point of the identified distinguishable region may be found that is nearest to that box corner (block 140). For example, if the identified region includes a substantially uniform boundary (e.g. document background 19), locating such a nearest point may include applying thresholding to a region near each box corner 52a through 52d.

The nearest point that is located near each box corner 52a through 52d may be identified with a corresponding page corner 16a through 16d of page image 12 (block 150).

When page corners 16a through 16d of page image 12 have been identified, image data related to page image 12 may be separated from remaining image data of scanned image 10. For example, the separated page image 12 may be analyzed or processed (e.g. optical character recognition or image processing), displayed, stored, or communicated via a network or other connection or channel.

An example of a method for automatic detection of corners of an image of a scanned document may be applicable when a scanned image conforms to applicable criteria. The criteria may be applicable to most or all documents that are scanned with some types of scanning systems.

Figure 5:
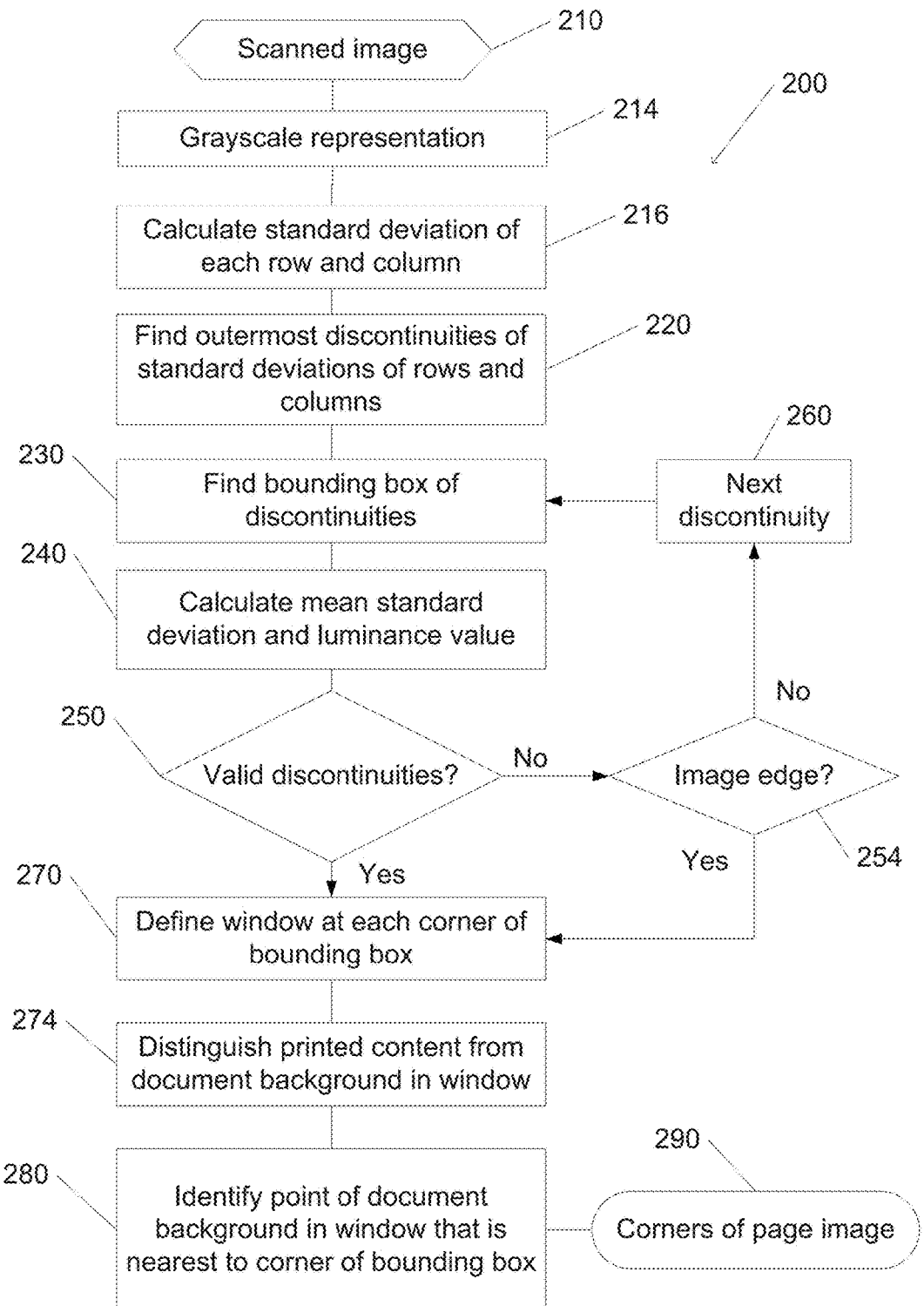
FIG. 5 is a flowchart of an example of the method of FIG. 3 that is applicable to some scanned images.
Figure 6:
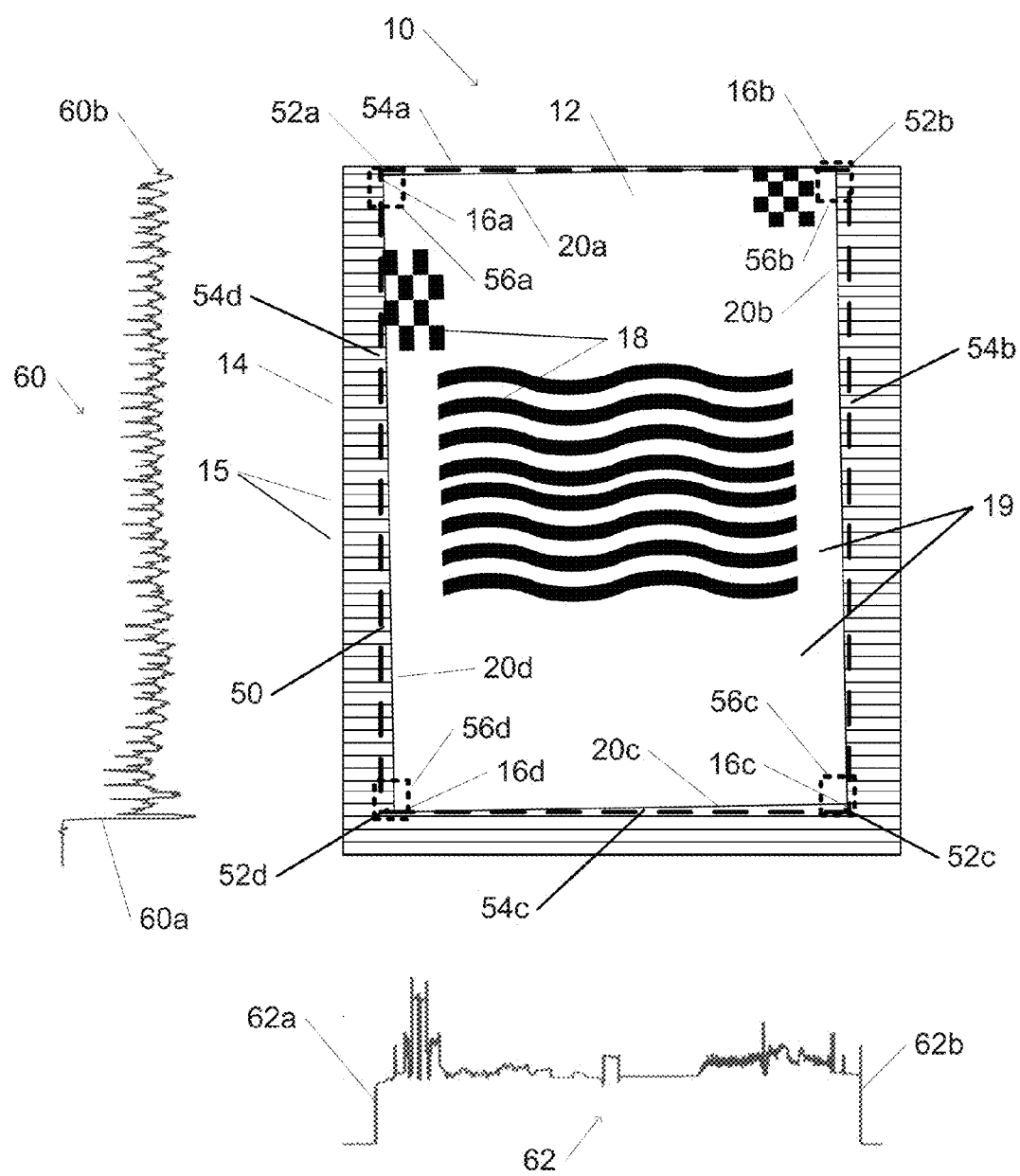
FIG. 6 illustrates an example of application of the method illustrated in FIG. 5.

FIG. 5 is a flowchart of an example of the method of FIG. 3 that is applicable to some scanned images. FIG. 6 schematically illustrates an example of application of the method illustrated in FIG. 5.

Automatic corner detection method 200 may be automatically applied to a document that is scanned with some types of scanning systems to produce a scanned image 10 (block 210). For example, the scanned document may be assumed to be substantially rectangular. Image background 14 may be assumed to be patterned or textured with a uniform pattern that is variable in one direction, but is uniform in a direction perpendicular to the first. For example, image background 14 may be characterized by line pattern 15, which varies in the vertical direction but is uniform in the horizontal. Further requirements and assumptions are described below in connection with related operations.

If scanned image 10 is not in the form of grayscale pixels recording luminance data, a grayscale representation of scanned image 10 may be constructed (block 214). For example, a polychromatic red (R), green (G), and blue (B) intensity data (RGB image) may be converted to monochromatic grayscale luminance (L) data using a linear additive formula. An example of such a formula is the formula:

$$L=0.30R+0.59G+0.11B.$$

The remainder operations of automatic corner detection method 200 may be applied to the grayscale representation.

A standard deviation may be calculated for the pixel grayscale values in each row and column of scanned image 10 (block 216). Standard deviation values are indicated schematically by row standard deviation graph 60 and column standard deviation graph 62. (The graphs are schematic and do not necessarily correspond to the illustrated content of scanned image 10.)

Outermost discontinuities of the row and column standard deviations may be found (block 220). For example, column standard deviation graph 62 includes leftmost discontinuity 62a and rightmost discontinuity 62b. Leftmost discontinuity 62a and rightmost discontinuity 62b may correspond to spaces between adjacent columns that bracket, or coincide with, a boundary between page edge 20d and page edge 20b, respectively, and image background 14. Similarly, row standard deviation graph 60 includes lowermost discontinuity 60a. Lowermost discontinuity 60a may correspond to adjacent rows that bracket, or coincide with, a boundary between page edge 20c and image background 14.

Lowermost discontinuity 60a may similarly be detected as the uppermost discontinuity of row standard deviation graph 60. In this case, uppermost end 60b of row standard deviation graph 60 may not be detected as a discontinuity. Uppermost end 60b corresponds to the uppermost row of scanned image 10, since page edge 20a corresponds substantially to the uppermost row of scanned image 10.

For example, lowermost discontinuity 60a, leftmost discontinuity 62a, and rightmost discontinuity 62b may be found by application to of a suitable algorithm, e.g. a Canny edge detector, to the row and column standard deviations (represented by row standard deviation graph 60 and column standard deviation graph 62, respectively).

Utilization of detection of discontinuities of row and column standard deviations may be limited to scanned images 10 in which page edges 20*a* through 20*d* of page image 12 are substantially parallel to rows and columns of scanned image 10. In other cases (e.g. more than about one or two degrees), page image 12 may be rotated with respect to scanned image 10 to an extent that the row or column standard deviations do not include detectable discontinuities. In such a case, however, standard deviations along suitable diagonally-aligned parallel linear arrays of pixels may include detectable discontinuities. Therefore, in such a case, a rotation angle may be automatically detected, or a user (after receiving an appropriate notification) may interact with a scanner system to indicate a suitable rotation.

Similarly, utilization of detection of discontinuities may be limited to cases where document background 19 is detectably different (e.g. as determined by a characterization such as a row or column standard deviation) from image background 14. For example, document background 19 may be a solid white or colored shade or hue, or contain slowly varying or pale patterns. Image background 14, on the other hand, may include a regular and prominent pattern. Similarly, utilization of detection of discontinuities may be limited to cases where a sufficiently large length of each of page edges 20*b* through 20*d* (in the case where page edge 20*a* coincides with an edge of scanned page 10) abuts document background 19 (e.g. page image 12 has substantially uniform margins). In other cases (e.g. a highly patterned document background 19, or printed content 18 abutting a sufficiently long section of page edge 20*b*, 20*c*, or 20*d*) a standard deviation of a row or column may not include a detectable discontinuity.

A bounding box 50 may be found as a box whose sides correspond to the rows and columns in which the discontinuities were found (block 230).

In order to validate the selection of bounding box 50, the region bounded by bounding box 50 may be examined to determine whether the bounded region is distinguishable from image background 14. For example, an average (mean) of the row and column standard deviations ($\text{std}_{mean}$), and a mean of the gray level or luminance ($\text{lum}_{mean}$), may be calculated in the vicinity (within bounding box 50) of the discontinuity defining each of box sides 54*a* through 54*d* (block 240). For example, the mean standard deviation and luminance values may be calculated for 15 rows or columns in the vicinity of the discontinuity.

The selection of discontinuities defining bounding box 50 may be validated by comparing the average standard deviations and luminance to predetermined ranges of values (block 250).

For example, a valid average standard deviation may be based on an assumption that a margin of page image 12 has average standard deviation that is different from that of image background 14. Thus, an average standard deviation that is compatible with that of image background 14 could indicate that bounding box 50 includes image background 14, and should be made smaller. Similarly, a valid mean luminance may be based on an assumption that document background 19 of page image 12 is different (e.g. lighter, whiter, or paler) than image background 14. Thus, a mean luminance that is compatible with that of image background 14 could indicate that bounding box 50 includes image background 14, and should be made smaller.

For example, a range of unacceptable mean standard deviations for each discontinuity row and column may be defined by lower ($T_L$) and upper ($T_H$) threshold values. Similarly, an acceptable value of mean luminance may be determined by a threshold value ($T_{white}$) that corresponds to a minimum expected mean luminance of a white or pale document background 19.

For example, a valid discontinuity may be indicated by satisfaction of any of validation criteria: $\text{std}_{mean} < T_L$, $\text{std}_{mean} > T_H$, or $\text{lum}_{mean} > T_{white}$. For example, satisfaction of the validation criteria may indicate that the average standard deviation is not characteristic of image background 14, or that the average gray level is not characteristic of image background 14.

For example, referring to the example shown in FIG. 6, an initial uppermost discontinuity for setting an uppermost box edge of a bounding box may have initially coincided with lowermost discontinuity 60*a*. An attempt to validate the discontinuity by calculating a mean standard deviation and luminance of the rows below lowermost discontinuity 60*a* may thus have indicated an invalid discontinuity.

If a discontinuity defining one of box sides 54*a* through 54*d* is invalid (e.g. none of the conditions regarding average standard deviation or luminance were met), the edge may be checked to determine if it coincides with an image edge (block 254). For example, one or more edges of page image 12 (page edge 20*a* in the example shown), may coincide with an edge of scanned image 10. For example, page edge 20*a* may represent an edge of a document that was located at an edge of a field of view or scanning range of a scanner sensor when the document was scanned.

Coincidence of a page edge with an edge of a scanned image may be detected by calculating the mean standard deviation and luminance for the rows or columns (corresponding to the type of discontinuity being checked) between the discontinuity and the edge of the scanned image that corresponds to the side of the bounding box defined by the discontinuity being checked.

For example, in the case of the example discussed above, lowermost discontinuity 60*a* was invalidated as defining uppermost box side 54*a*. However, the standard deviations and luminance of all rows between the row corresponding to lowermost discontinuity 60*a* and the uppermost edge of scanned image 10 may be averaged. In this case, the calculated mean standard deviation may satisfy the validation criteria, thus indicating that uppermost page edge 20*a* corresponds to the uppermost edge of scanned image 10. Uppermost box side 50*a* may then be defined as coinciding with the uppermost edge of scanned image 10.

If side of bounding box 50 that was to be defined by the invalidated discontinuity does not coincide with an edge of scanned image 10 (e.g. indicating that the invalidated discontinuity lies within image background 14), the next discontinuity inward from the invalidated discontinuity may be selected (block 260). A bounding box may then be defined using that next discontinuity (returning to block 230) and validated (blocks 240 and 250).

If all discontinuities were validated, or a side of bounding box 50 was determined to coincide with an edge of scanned image 10, a window 56*a* through 56*d* may be defined at each box corner 52*a* through 52*d*, respectively, of bounding box 50 (block 270). For example, each box corner 52*a* through 52*d* may be defined as a pixel whose coordinates are those of the pixel row and column that define those sides of bounding box 50 that meet at the corner being defined. Each window 56*a* through 56*d* may be defined relative to its corresponding box corner 52*a* through 52*d*. For example, the window may be bounded on the outside by the pair of box sides 54a through 54d that meet at each box corner 52a through 52d. Inner bounds of the window defined by a predetermined number of rows and column pixels, or a predetermined fraction of scanned image 10 or of bounding box 50. For example, a size of a window may be set at about 5% of the size of scanned image 10 (e.g. about 80 pixels by 80 pixels).

Printed content 18 of page image 12 and sections of image background 14 that are within each window 56a through 56d may be distinguished from document background 19 within the same window 56a through 56d (block 274). For example, if document background 19 is lighter (e.g. white) than printed content 18 or image background 14, a binary thresholding technique may be applied to form a binary (e.g. black and white or bi-tonal) image within window 56a through 56d. In such a thresholding technique, any pixel whose gray level (luminance) is lighter than a threshold value (e.g. $T_{white}$) may be set to white. Similarly, any pixel whose gray level is darker than the threshold value may be set to black. Thus, a region of document background 19 that forms a margin of page image 12 may be set as one color in the resulting binary image in each window 56a through 56d. As another example, other pairs of colors may be used in the binary image, or other techniques may be used to distinguish between document background 19 and other content of each window 56a through 56d.

Figure 7:
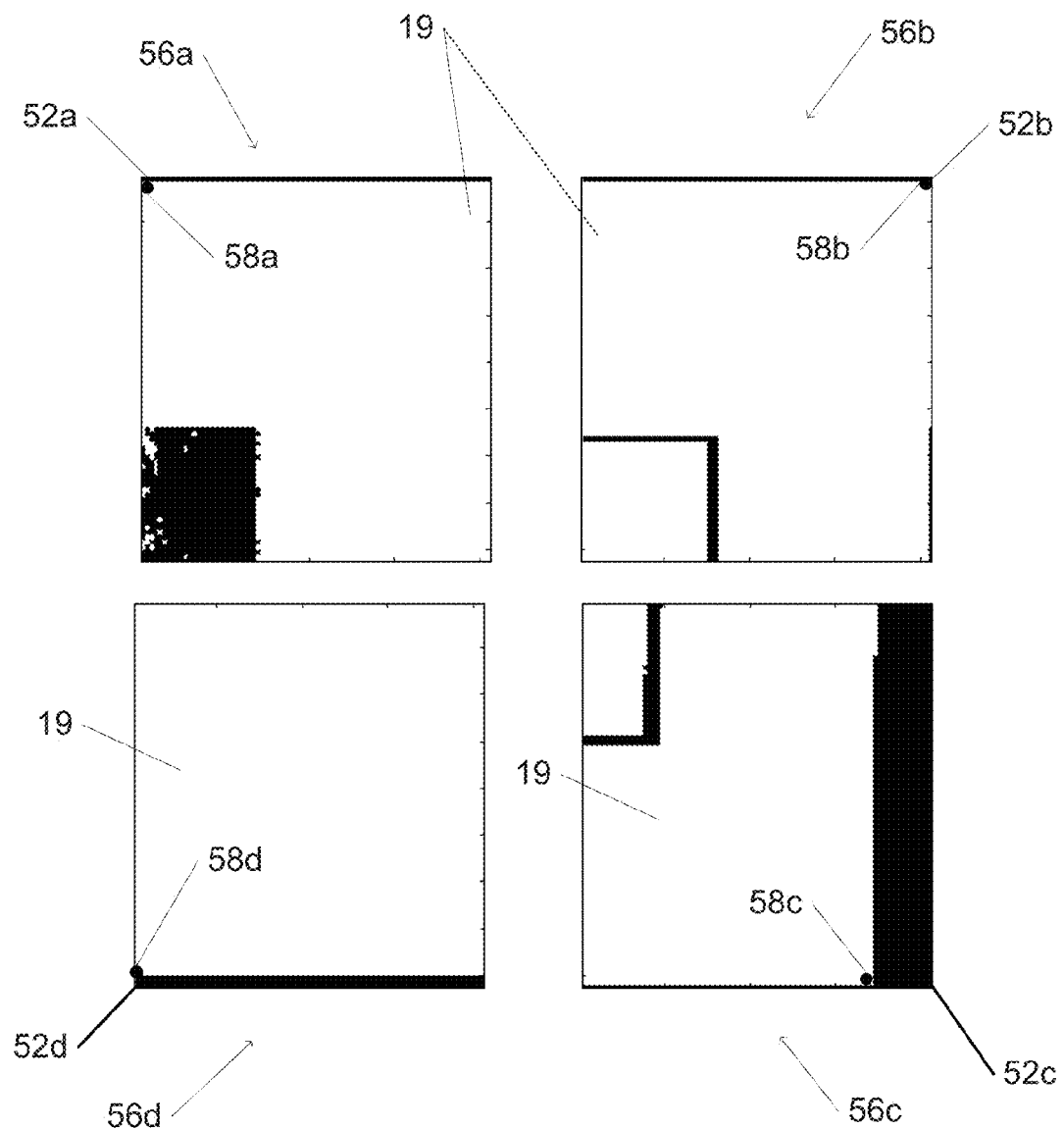
FIG. 7 schematically illustrates binary corner windows in application of the method illustrated in FIG. 5.

FIG. 7 schematically illustrates examples of binary corner windows in application of an example of the method illustrated in FIG. 5. The examples of windows 56a through 56d shown illustrate aspects of the method, and may not be identical to windows 56a through 56d shown in FIG. 6.

Within each window 56a through 56d, a point of document background 19 that is nearest to corresponding box corner 52a through 52d may be identified (block 280). For example, in windows 56a and 56b, nearest background points 58a and 58b, respectively, are located close to box corners 52a and 52b. On the other hand, in windows 56c and 56d, nearest background points 58c and 58d are easily distinguishable from box corners 52c and 52d, respectively. For example, a nearest background point may not coincide with its corresponding box corner if page image 12 is rotated or skewed with respect to scanned image 10 or image background 14.

Application of formation of a binary image in order to identify a point of the image back nearest to a box corner 52a through 52d may be limited to a page image 12 with margin corners that include primarily document background 19. In other cases, conversion of the area of a window 56a through 56d to a binary image might not reliably distinguish the margin from image background 14.

Page image 12 may thus be distinguished from the remainder of scanned image 10 by identifying page corners 16a through 16d with nearest background points 58a through 58d, respectively (block 290).

In accordance with an example of automatic corner detection on a scanned document, a computer program application stored in non-volatile memory or computer-readable medium (e.g., register memory, processor cache, RAM, ROM, hard drive, flash memory, CD ROM, magnetic media, etc.) may include code or executable instructions that when executed may instruct or cause a controller or processor to perform methods discussed herein, such as an example of a method for automatic corner detection on a scanned document.

The computer-readable medium may be a non-transitory computer-readable media including all forms and types of memory and all computer-readable media except for a transitory propagating signal. In one example, external memory may be the non-volatile memory or computer-readable medium.

We claim:

1. A method comprising:
   receiving, by a system including a processor, an image of a document against a background;
   finding, by the system, a bounding box that bounds a region of the image that is distinguishable from the background;
   finding, by the system, coordinates of a plurality of points of the distinguishable region, each point of the plurality of points being a point of the distinguishable region that is closest to the respective corner of the bounding box, wherein finding the coordinates of the plurality of points comprises:
      defining windows at respective corners of the bounding box, and
      within each of the windows, identifying a first portion of the window and a second portion of the window, the first portion including content of the document, and the second portion including the background; and
      identifying the plurality of points based on identifying the first and second portions in each of the windows; and
   identifying, by the system, the document within the image as a region of the image whose corners are defined by the found coordinates.

2. The method of claim 1, wherein finding the bounding box comprises converting a polychromatic image to a grayscale image.

3. The method of claim 1, wherein finding the bounding box comprises calculating a standard deviation of each linear array of a plurality of parallel linear arrays of pixels, and detecting a discontinuity in the calculated standard deviations.

4. The method of claim 3, wherein each linear array comprises a row or a column of pixels.

5. The method of claim 4, wherein finding the bounding box comprises defining a side of the bounding box by a row or column at which the discontinuity occurs.

6. The method of claim 5, further comprising verifying each defined side of the bounding box by determining whether a region bounded by the bounding box is distinguishable from the background.

7. The method of claim 6, wherein determining whether the bounded region is distinguishable comprises calculating a mean standard deviation or mean luminance of rows or columns of the image.

8. The method of claim 3, wherein finding the bounding box comprises defining a side of the bounding box as an edge of the image if a region between the discontinuity and the edge is distinguishable from the background.

9. The method of claim 3, wherein the background is characterized by a variation in grayscale along a single direction, and wherein each linear array is either substantially parallel to or substantially perpendicular to the single direction.

10. The method of claim 1, wherein finding the coordinates of the plurality of points further comprises converting content in each of the windows to a respective binary image.

11. The method of claim 1, wherein a first of the plurality of points in a first of the windows is identified as a point at a boundary between the first portion and the second portion in the first window.

12. A non-transitory computer readable medium having stored thereon instructions that when executed by a system including a processor cause the system to:
- receive an image of a document against a background;
- find a bounding box that bounds a region of the image that is distinguishable from the background;
- find coordinates of a plurality of points of the distinguishable region, each point of the plurality of points being a point of the distinguishable region that is closest to the respective corner of the bounding box, wherein finding the coordinates of the plurality of points comprises:
  - defining windows at respective corners of the bounding box, and
  - within each of the windows, identifying a first portion of the window and a second portion of the window, the first portion including content of the document, and the second portion including the background; and
  - identifying the plurality of points based on identifying the first and second portions in each of the windows; and
- identify the document within the image as a region of the image whose corners are defined by the found coordinates.

13. The non-transitory computer readable medium of claim 12, wherein finding the bounding box comprises converting a polychromatic image to a grayscale image.

14. The non-transitory computer readable medium of claim 12, wherein finding the bounding box comprises calculating a standard deviation of each linear array of a plurality of parallel linear arrays of pixels, and detecting a discontinuity in the calculated standard deviations.

15. The non-transitory computer readable medium of claim 14, wherein each linear array comprises a row or a column of pixels.

16. The non-transitory computer readable medium of claim 15, wherein finding the bounding box comprises defining a side of the bounding box by a row or column at which the discontinuity occurs.

17. The non-transitory computer readable medium of claim 16, wherein the instructions when executed cause the system to further verify each defined side of the bounding box by determining whether a region bounded by the bounding box is distinguishable from the background.

18. The non-transitory computer readable medium of claim 17, wherein determining whether the bounded region is distinguishable comprises calculating a mean standard deviation or mean luminance of rows or columns of the image.

19. The non-transitory computer readable medium of claim 14, wherein finding the bounding box comprises defining a side of the bounding box as an edge of the image if a region between the discontinuity and the edge is distinguishable from the background.

20. The non-transitory computer readable medium of claim 14, wherein the background is characterized by a variation in grayscale along a single direction, and wherein each linear array is either substantially parallel to or substantially perpendicular to the single direction.

21. A system comprising:
- at least one processor; and
- a non-transitory computer readable medium storing instructions executable by the at least one processor to:
  - receive an image of a document against a background;
  - analyze pixels of a grayscale representation of the image to find a bounding box that bounds a region of the image that is distinguishable from the background;
  - find coordinates of a plurality of points of the distinguishable region, each point of the plurality of points being a point of the distinguishable region that is closest to that respective corner of the bounding box, wherein finding the coordinates of the plurality of points comprises:
    - defining windows at respective corners of the bounding box, and
    - within each of the windows, identifying a first portion of the window and a second portion of the window, the first portion including content of the document, and the second portion including the background; and
    - identifying the plurality of points based on identifying the first and second portions in each of the windows; and
  - extract from the image a document image whose corners are defined by the found coordinates.

* * * * *